United States Patent Office 3,228,912
Patented Jan. 11, 1966

3,228,912
PRODUCTION OF POLYSULFONATES
Kurt Demmler and Harry Distler, Ludwigshafen (Rhine), Franz-Friedrich Miller, Ludwigshafen (Rhine), Gartenstadt, and Lothar Wuertele, Ludwigshafen (Rhine), Germany, assignors to Badische Anilin- & Soda-Fabrik Aktiengesellschaft, Ludwigshafen (Rhine), Germany
No Drawing. Filed Jan. 26, 1961, Ser. No. 84,995
Claims priority, application Germany, Jan. 29, 1960, B 56,438; Aug. 10, 1960, B 58,922
10 Claims. (Cl. 260—49)

This invention relates to new polysulfonates and to a process for their production. It is an object of this invention to provide new polysulfonates which can be used for a great variety of industrial purposes, e.g. for the production of shaped articles, adhesives, sheeting and films, or as casting resins and laminating resins.

Another object of this invention is to provide a process for the production of the said new polysulfonates.

Further objects of the invention will become apparent to the expert from the following description.

We have found that new high molecular weight polysulfonates can be prepared by reacting an organic compound which contains in the molecule at least two active hydrogen atoms which are not combined in the form of water of crystallization, in the form of alcohol of crystallization or in the form of acid groups, with a vinyl sulfonic acid ester of an organic polyol at temperatures between about −50° and about 200° C. The reaction takes place in a polyaddition reaction which, in the case of bifunctional compounds, proceeds according to the following scheme:

$n\text{CH}_2=\text{CH}-\text{SO}_2-\text{O}-\text{R}-\text{O}-\text{SO}_2-\text{CH}=\text{CH}_2 + n\text{HXH}$
$\rightarrow \text{HX}(\text{CH}_2-\text{CH}_2-\text{SO}_2-\text{O}-\text{R}-\text{O}-\text{SO}_2-\text{CH}_2-\text{CH}_2-\text{X})_{n-1}\text{CH}_2-\text{CH}_2-\text{SO}_2-\text{O}-\text{R}-\text{OSO}_2-\text{CH}=\text{CH}_2$ In these formulae, R stands for a divalent alkyl, cycloalkyl, alkenyl, aryl, aralkyl, diarylalkyl, diarylsulfone, dialkylsulfone, polyarylalkyl or heterocyclic radical, and $\text{XH}_2$ stands, for example, for a primary monoamine, primary and/or secondary polyamine, bis-lactams, acid amide, hydrazide, sulfonamide, polyphenol, polythiophenol, polyalkanolamine, polymercaptan or phenol-aldehyde condensation product. In the reaction of ethylene glycol divinyl sulfonic acid ester with methyl amine, the polyaddition can be illustrated by the following equation:

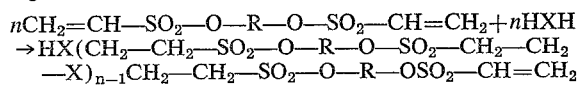

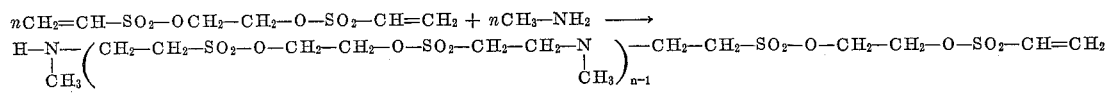

The term "vinyl sulfonic acid ester of an organic polyol" indicates that the ester contains at least two vinyl sulfonic acid radicals.

By the polyaddition reaction according to this invention, high molecular weight linear thermoplastic polysulfonates are obtained in the case of bifunctional reactants, and high molecular weight crosslinked polysulfonates are obtained in the case of higher functional reactants, such as tri-, penta or hexa-vinyl sulfonic acid esters and/or triols, trimercaptans or primary diamines.

Vinyl sulfonic acid esters which can be reacted according to this invention are obtainable, for example, according to the processes described in the copending U.S. applications Serial No. 43,009 (now U.S. Patent No. 3,121,-730), filed July 15, 1960, by Harry Distler, and Serial No. 12,911 (now abandoned), filed March 7, 1960, by Harry Distler and Karlhugo Kuespert, or according to the analogous processes for the production of vinyl sulfonic acid esters of novolaks such as the phenol-formaldehyde and the phenol-acrolein condensation products as polyols described in Examples 14, 23 and 26 hereinafter. Suitable polyols are, for example, saturated aliphatic straight-chain or branched and cycloaliphatic polyols containing 2 to about 18 carbon atoms and 2 or more, for example 3, 4 or 5, hydroxyl groups. Such polyols include alkanediols and cycloalkanediols, such as ethylene glycol, diethylene glycol, triethylene glycol, polyethylene glycol, propanediol-1,2, butanediol-1,2, the diglycols or higher polyglycols which can be prepared from propylene oxide, propanediol-1,3, butanediol-1,4, 2-methylpropanediol-1,3, pentanediol-1,3, pentanediol-1,5, neopentyl glycol, 2-ethylpropanediol-1,3, hexanediol-1,6, octanediol-1,8, 2-ethylhexanediol-1,3, decanediol-1,10, quinitol, cyclohexanediol-1,2, cyclohexanediol-1,4, 2,2-(4,4'-dihydroxydicyclohexyl)-propane and 2,6-dihydroxydecahydronaphthalene.

Aromatic polyols containing 2 or more hydroxyl groups include dihydric and higher polyhydric phenols derived from benzene, naphthalene or anthracene, such as hydroquinone, resorcinol, pyrocatechol, phloroglucinol, pyrogallol, hydroxyhydroquinone, 4,4'-dihydroxydiphenyl, 2,2'-dihydroxydiphenyl, 1,4-dihydroxynaphthalene, 2,6-dihydroxynaphthalene, 1,2-dihydroxynaphthalene, 1,5-dihydroxyanthracene and 2,2'-dihydroxydinaphthyl-1,1', ar-alkylpolyols derived from toluene or xylene, such as or-tho-, meta- and para-hydroxybenzyl alcohol and ortho-, meta- and para-xylylene glycol, as well as from heterocyclic polyols, such as 1,4-dihydroxyquinoline.

Bis-(hydroxyaryl)-alkanes with identical or different aryl radicals are especially suitable for the preparation of the said sulfonic acid esters. In addition to hydroxyl groups, the aryl radicals may also contain other substituents, such as halogen atoms or alkyl groups, which do not react during conversion of the said bis-(hydroxyaryl)-alkanes to vinyl sulfonic acid esters. The alkyl radical connecting the two hydroxyphenyl radicals in the said bis-(hydroxyaryl)-alkanes may be linear-aliphatic or cycloaliphatic and may be substituted by radicals which remain inert during conversion of the bis-(hydroxyaryl)-alkanes to vinyl sulfonic acid esters. Suitable compounds of the said kind include, above all, bis-(hydroxyphenyl)-alkanes which contain a total of 2 to 6, preferably 2 to 4, hydroxyl groups attached to the benzene nuclei and which are derived from straight-chain or branched alkanes with 1 to 18, preferably 1 to 13, carbon atoms, or from cycloalkanes with 6 to 8, preferably 6, ring carbon atoms, such as bis-(4-hydroxyphenyl)-methane, 2,2-bis-(4-hydroxyphenyl)-propane, 1,1-bis-(4-hydroxyphenyl)-cyclohexane, 1,1-bis-(4-hydroxy-3-methylphenyl)-cyclohexane, 2,2-bis-(2-hydroxy-4-tertiary-butylphenyl)-propane, 3,4-bis-(4-hydroxyphenyl)-hexane and 1,1-bis-(4-hydroxyphenyl)-1-phenylethane, as well as methane derivatives which, in addition to two hydroxyaryl groups, contain an alkyl radical with at least two carbon atoms and an alkyl radical with at least one carbon atom, such as 2,2-bis-(4-hydroxyphenyl)-butane, 2,2-bis-(4-hydroxyphenyl)-pentane, 3,3-bis-(4-hydroxyphenyl)-pentane, 2,2-bis - (4 - hydroxyphenyl)-3-methylbutane, 2,2-bis-(4-hydroxyphenyl)-hexane, 2,2-bis-(4-hydroxyphenyl)-4-methylpentane, 2,2-bis-(4-hydroxyphenyl)-heptane, 4,4-bis-(4-hydroxyphenyl)-heptane and 2,2-bis-(4-hydroxyphenyl)-tridecane. Bis-(hydroxyaryl)-alkanes of the said kind are readily obtained in known manner by condensation of aldehydes or ketones with phenols.

Polyols that may be used for the production of the said vinyl sulfonic acid esters also include compounds such as bis-(4-hydroxyphenyl)-sulfone, bis-(hydroxybenzyl)-benzenes, and phenol-aldehyde condensation products, i.e. soluble, fusible, polymeric products formed by condensation of a phenol with an aldehyde such as formaldehyde or acrolein known as "novolaks."

Vinyl sulfonic acid esters of aromatic polyols, such as polyhydric phenols, and/or of bis-(hydroxyaryl)-alkanes of the said kind as well as those of novolaks such as phenol-formaldehyde and/or phenol-acrolein condensation products are especially suitable as initial products for the production of the polysulfonates according to this invention.

By "active hydrogen atoms" we understand hydrogen atoms which react according to the known analytical method of Zerewitionoff (cf., for example, Houben-Weyl, "Methoden der organischen Chemie," vol. 2, Georg Thieme Verlag, Stuttgart, A53, p. 317) with, for example methyl magnesium iodide with evolution of hydrogen. Organic compounds which contain at least two active hydrogen atoms in the molecule and which are suitable for the production of polysulfonates according to this invention are, for example, those polyols which have been described above as being suitable for the production of vinyl sulfonic acid esters.

Polyols of good suitability are bis-(hydroxyphenyl)-alkanes of the said kind which contain a total of 2 to 6, preferably 2 to 4, hydroxyl groups attached to the benzene nuclei and which are derived from straight-chain or branched alkanes with 1 to 18, preferably 1 to 13, carbon atoms, or from cycloalkanes with 6 to 8, preferably 6, ring carbon atoms. Other suitable compounds with at least 2 active hydrogen atoms are polyalkanolamines which can be prepared in conventional manner (for example from alkene oxides with 2 to 5, preferably 2 to 3, carbon atoms, such as ethylene oxide and propylene oxide, and ammonia or straight-chain aliphatic amines, such as ethylene amine, diethylene triamine or triethylene tetramine), such as diethanolamine, triethanolamine, pentahydroxyethyl-diethylene triamine, pentahydroxyisopropyl-diethylene triamine and hexahydroxyisopropyl-triethylene-tetramine. Aromatic polyols, i.e. dihydric and higher polyhydric phenols which are derived from benzene, naphthalene or anthracene, such as hydroquinone and other phenols of this kind as specified above, are also suitable compounds with active hydrogen atoms.

Particulary suitable organic compounds with at least two active hydrogen atoms in the molecule are those which contain nitrogen atoms and in which the active hydrogen atoms are attached to the nitrogen atoms, as in amino, amido and imino groups, and which have molecular weights of between 31 and about 5,000. Such compounds include: straight-chain and branched saturated aliphatic primary monoamines, such as methylamine, ethylamine, propylamine, butylamine, isopropylamine, isooctylamine and stearylamine; aliphatic polyamines, such as ethylene diamine, diethylene triamine, triethylene tetramine, and the polyethylene imines with molecular weights of between 800 and about 5,000 which can be prepared in conventional manner; saturated cycloaliphatic amines, such as cyclohexylamine, diaminodicyclohexylmethane and diaminodimethyldicyclohexylmethane; aromatic primary monoamines, such as aniline, toluidine and naphthylamine; aromatic polyamines, such as ortho-, meta- and para-phenylene diamine, bis-(para-aminophenyl)-methane, bis-(para-N-aminomethylphenyl)-methane, bis-(para-methylaminophenyl)-methane, bis-(para-aminodiphenyl)-sulfone and bis-(para-N-methylaminophenyl)-sulfone; carbamates of amines which are readily prepared in conventional manner by the action of carbon dioxide on amines of the kind mentioned above, such as butylamine, diethylene triamine and aniline; saturated and olefinically unsaturated carboxylic acid amides, such as acetamide, butyramide, stearylamide, acrylamide and methacrylamide as well as amido-group containing polyamines such as are obtainable, for example, by reaction of dimerized fatty acids with polyamines, e.g. by reaction of dimerized ricinoleic acid with propylene diamine, and are described, for example, in U.S. patent specification 2,705,223; bislactams, such as methylene-bis-caprolactam and methylene-bis-caprylic-lactam; urea and urea derivatives, such as N-methylurea, N-methyleneurea, N,N'-dimethylurea, thiourea and N-phenylthiourea, as well as guanidine and $\alpha,\beta,\alpha,\beta$-diureylene-ethane; hydrazides, such as acrylic acid hydrazide and adipic acid dihydrazide; sulfonamides, such as ortho-, meta- and para-toluenesulfonamide. Further suitable organic compounds with at least two active hydrogen atoms in the molecule are those in which the active hydrogen atoms are attached to sulfur atoms, as in polythiols such as polythioether polymercaptans and thioglycolic acid esters of polyhydric alcohols.

In general, vinyl sulfonic acid esters of the said kind react with the said compounds containing active hydrogen atoms at temperatures as low as room temperature with the formation of polysulfonates, but the polyaddition reaction can, in some cases, also be conducted with advantage at temperatures of up to 150° C. or more, i.e. up to about 200° C. It is, however, also possible to prepare polysulfonates from highly reactive amines, especially from aliphatic amines such as methylamine, ethylamine and butylamine, and vinyl sulfonic acid esters at temperatures of —50° C. or less.

Compounds with two or more active hydrogen atoms in the molecule in which the active hydrogen atoms are present exclusively in the form of water of crystallization, alcohol of crystallization (primary aliphatic alcohols, especially methanol, ethanol and isopropyl alcohol, which are combined in the crystal lattice), or as acid groups such as carboxylic, sulfonic, sulfinic and phosphoric acid groups, are not suitable for the production of polysulfonates according to this invention.

In some cases, particularly if polysulfonates are to be prepared from vinyl sulfonic acid esters and polyols or polythiols, the polyaddition reaction is preferably conducted with the addition of 0.1 to 10 mol. percent with reference to the amount of polyol or polythiol, of basic-reacting substances. Basic reacting substances suitable for the purposes of this invention include; the oxides, hydroxides, carbonates, borates and phosphates of the alkali and alkaline earth metals which are soluble in water giving an alkaline reaction, such as calcium oxide, sodium hydroxide, potassium hydroxide, sodium carbonate, potassium carbonate, sodium bicarbonate, sodium borate and disodium phosphate; tertiary amines, such as tributylamine, dimethylaniline, dimethylcyclohexylamine and dibutylcyclohexylamine; quaternary ammonium salts which dissociate in aqueous solution when hot; alcoholates, especially alkali metal alcoholates, such as sodium methylate, potassium methylate, sodium ethylate, potassium ethylate, sodium propylate, potassium propylate, sodium butylate, potassium butylate, sodium glycolate and potassium glycolate; and phenolates, such as sodium phenolate. If vinyl sulfonic acid esters are reacted with polyols according to this invention, the reaction is advantageously conducted in the presence of alcoholates, preferably in the presence of metal alcoholates. In that case, it is expedient to add alkali metal alcoholates or phenolates of the polyols which are being reacted with the vinyl sulfonic acid esters. The said alcoholates or phenolates can also be prepared in situ in the reaction mixture, if sodium hydroxide or potassium hydroxide is added thereto. In the production of polysulfonates from vinyl sulfonic acid esters and polyols according to this invention, 0.1 to 10, preferably 1 to 5, mol percent of alcoholates or alkali hydroxides, with reference to the amount of polyol, are advantageously added to the reaction mixture.

The alcoholates of monohydric alcohols, such as sodium methylate, potassium methylate, sodium ethylate, potassium ethylate, sodium propylate and potassium propylate, act not only as accelerators but also as regulators, i.e. as chain stoppers, particluraly if they are added in the production of polysulfonates according to the invention from vinyl sulfonic acid esters and compounds which contain two or more hydrogen atoms attached to nitrogen atoms in the molecule.

In general, it is expedient to react the said vinyl sulfonic acid esters with such amounts of compounds of the above kind containing at least two active hydrogen atoms in the molecule that there is one active hydrogen atom per vinyl sulfonic acid ester group, i.e., to react equivalent amounts of the said rectants. For the production of polysulfonates with special properties it may, however, be of advantage to be used one of the said reactants in excess of the equivalent amount.

The proportion in which the said reactants can be employed may be varied within wide limits, viz., between 1 and a maximum of $m$ times the equivalent amount of vinyl sulfonic acid esters may be used per mol of organic compounds containing at least two active hydrogen atoms in the molecule ($m$ being the average number of vinyl sulfonic acid ester groups per molecule of the said vinyl sulfonic acid esters); or between 1 and a maximum of $n$ times the equivalent amount of organic compounds containing at least two active hydrogen atoms in the molecule may be used per mol of vinyl sulfonic acid esters ($n$ being the average number of active hydrogen atoms per molecule of the said organic compounds containing at least two active hydrogen atoms in the molecule).

Thus, for example, low molecular weight polysulfonates are obtained if 3 times or about 3 times the equivalent amount of an organic compound containing 3 active hydrogen atoms per molecule, for example, of an amine containing 3 hydrogen atoms attached to nitrogen atoms, is reacted with divinyl sulfonic acid esters.

High molecular weight polysulfonates which ideally have linear structure are obtained by reacting twice or about twice the equivalent amount of an organic compound containing 3 active hydrogen atoms per molecule, for example of an amine containing 3 hydrogen atoms attached to nitrogen atoms, with divinyl sulfonic acid esters. Such linear high molecular weight polysulfonates contain NH groups and are suitable, for example, for use as hardening agents for epoxy resins. The said linear polysulfonates can also be hardened by means of, for example, linear high molecular weight polysulfonates containing free vinyl sulfonic acid ester groups or by means of low molecular weight polysulfonates containing free vinyl sulfonic acid ester groups. High molecular weight polysulfonates which ideally have linear structure are also obtained by reacting twice or about twice the equivalent amount of trivinyl sulfonic acid esters with organic compounds containing two active hydrogen atoms per molecule, for example with an aliphatic monoamine. Such linear high molecular weight polysulfonates contain free vinyl sulfonic acid ester groups and can be hardened by means of, for example, linear high molecular weight polysulfonates containing active hydrogen atoms or low molecular weight polysulfonates containing active hydrogen atoms, for example hydrogen atoms attached to nitrogen atoms, as well by means of aliphatic or aromatic amines.

Crosslinked high molecular weight polysulfonates, however, are obtained if the equilavent or about the equivalent amount of, for example, amines containing 3 hydrogen atoms attached to nitrogen atoms is reacted with divinyl sulfonic acid esters according to the present invention.

The process according to this invention can be conducted in bulk, in solution, in aqueous emulsion or in suspension. Suitable solvents are those which do not enter into any reaction with the reactants or which react only relatively slowly with the same, as for example water, butanol, benzene, toluene, methylene chloride, ethylene chloride, chloroform, carbon tetrachloride, or mixtures thereof. Monohydric alcohols, such as methanol and butanol, are not siutable as solvents, if polysulfonates are prepared according to this invention from vinyl sulfonic acid esters and polyols in solution and in the presence of alcoholates or alkali hydroxides.

The polyaddition reaction may also be conducted in admixture with compounds or resins which tend to addition or polyaddition under the same conditions, as for example in the presence of monoepoxides, polyepoxides, monoglycidyl ethers, polyglycidyl ethers, monoisocyanates or polyisocyanates.

Polysulfonates prepared according to this invention may be used as lubricating oils, plasticizers, casting resins, laminating resins, lacquers, varnishes, putties and adhesives and are suitable for the production of shaped articles, sheeting, films and expanded porous articles. They may be worked up in the usual manner, if desired with the addition of conventional plasticizers and fillers.

Polysulfonates according to the present invention may also be used, for example, for the manufacture of varnished leather. For the latter application, it is of particular advantage to prepare the polysulfonates in situ on the leather.

The invention will be further illustrated, but is not limited, by the following examples. The parts specified are by weight; the $k$-values specified were determined according to H. Fikentscher, Cellulose Chemie, 13, p. 58 (1932).

*Example 1*

64 parts of divinyl sulfonic acid ester of 2,2-bis-(4-hydroxyphenyl)-propane (hereinafter referred to as "DDS") are mixed with 15 parts of bis-(4-aminophenyl)-methane at 90° C. The mixture is heated for 24 hours at 120° C. in a mold. A hard, tough shaped article is obtained which becomes elastically deformable at about 130° C. and which even at elevated temperatures, is practically not attacked by dilute hydrochloric acid or alcohol.

*Example 2*

53 parts of DDS are mixed with 12 parts of aniline at 75° C. The mixture is maintained at 120° C. for 31 hours. A hard, brittle mass is obtained, which is only partly soluble in a mixture of equal parts of butanol and toluene. The polysulfonate softens at about 93° C. (determined according to Krämer-Sarnow-Nagel; cf. Wilborn, "Physikalische und Technologische Prüfungsverfahren für Lacke und ihre Rohstoffe," vol. 1, p. 20, Berliner Union, Stuttgart, 1953).

*Example 3*

52 parts of divinyl sulfonic acid ester of bis-(4-hydroxyphenyl) - sulfone (hereinafter referred to as "DSDS") are mixed with 12 parts of bis-(4-aminophenyl)-methane at 85° C. The mixture is heated for 4½ hours at 120° C. A hard, somewhat brittle mass is obtained which, even at 70° C. is practically not attacked by 10% hydrochloric acid and which does not dissolve in the usual solvents. The mass softens at about 120° C.

*Example 4*

12 parts of diaminodimethydicyclohexylmethane are added, at room temperature and while stirring to a mixture of 20 parts of DDS and 20 parts of an epoxy resin having an epoxide number of 0.50 (determined according to "Organic Analyses," vol. 1, p. 135, Interscience Publishers, New York, 1953), which has been obtained in the usual manner from 2,2-bis-(4-hydroxyphenyl)-propane and epichlorhydrin, strong evolution of heat taking place during this operation. The mixture is maintained at 100° C. for 20 hours. A clear mass is obtained, which shows elastic properties at temperatures above about 130° C.

*Example 5*

18 parts of n-butylamine are added in the course of 35 minutes, at about 90° C., in a nitrogen atmosphere and while stirring vigorously, to 204 parts of DDS. The temperature rises to 113° C. The reaction mixture is then kept at 120° C. for 15 minutes. A yellow clear resin is obtained which softens at about 65° C., dissolves in methanol/acetone at elevated temperatures giving a clear solution, and which can be used, for example, for the production of molding materials.

53 parts of the said resin are mixed, at 130° C., with 6 parts of 4,4'-diaminodiphenylmethane. The mixture hardens to a substantial degree within only a few minutes. It is then cured for 15 hours at 120° C. A hard, somewhat brittle substance is obtained, which shows elastic properties at temperatures above 90 to 100° C.

Example 6

50 parts of DDS are mixed, at 150° C., with 29 parts of methylene-bis-caprolactam in a nitrogen atmosphere, the methylene-bis-caprolactam dissolving during this operation. The temperature of the mixture is maintained at 150° C. for 1 hour. A resin is obtained which is hard at room temperature and which does not dissolve in a mixture of equal parts of butanol and toluene. It softens at about 123° C. (determined according to Krämer-Sarnow-Nagel).

Example 7

A paste of 60 parts of DDS and 15 parts of finely powdered adipic acid dihydrazide is maintained at 150° C. in a mold for 45 minutes. A hard article is obtained which softens at about 120° C., shows elastic properties above this temperature and still contains traces of unreacted adipic acid dihydrazide.

Example 8

A mixture of 36 parts of DDS, 15 parts of p-toluenesulfonamide and 5 parts of N,N-dibutylcyclohexylamine as a catalyst is heated to 150° C. for 5 hours in a nitrogen atmosphere. A hard polysulfonate is obtained, which softens at about 67° C. and which dissolves only with difficulty in a mixture of equal parts of butanol and toluene.

Example 9

A mixture of 52 parts of DDS and 20 parts of N,N',N''-pentahydroxyisopropyldiethylene triamine is heated at 100° C. for 26 hours. A clear, horny polysulfonate is obtained which softens at 70° C.

Example 10

A mixture of 50 parts of DDS and 20 parts of N,N',N'',N''' - hexahydroxyisopropyltriethylene tetramine is heated for 26 hours at 100° C.' A clear, horny mass is obtained which softens at 70° C.

Example 11

A mixture of 100 parts of a commercial polydisulfide mercaptan from bis-(2-chlorethyl)-formal and sodium polysulfide with a molecular weight of about 4000, 15 parts of DDS and 2 parts of dibutylcyclohexylamine is heated at 120° C. for 17 hours. A soft, elastic polysulfonate is obtained, which adheres well to metals and is insoluble in the usual solvents. It may be used, for example, for sealing joints in metallic articles.

Example 12

A solution of 204 parts of DDS in 102 parts of methanol and 102 parts of acetone is allowed to flow into 90 parts of diethylene triamine within one hour at room temperature and in a nitrogen atmosphere, while stirring. The temperature of the reaction mixture rises to about 55° C. After filtration, a clear, brown solution is obtained which has a viscosity of 194 DIN seconds (Ford cup DIN 53,211, 4 mm. jet). It contains 60% by weight of a polysulfonate polyamine which has a calculated H equivalent of about 87. This H equivalent is defined as the quotient of the molecular weight divided by the number of active H atoms attached to the nitrogen. The solution is suitable as a hardening agent for epoxy resins.

22 parts of the said solution are mixed with 30 parts of an epoxy resin having the epoxide number 0.50 which has been prepared in the usual manner from 2,2-(4,4'-dihydroxydiphenyl)-propane and epichlorhydrin. A thin layer of the mixture is applied to a metal sheet. After drying the coated sheet for 18 hours at room temeprature and heating it for about an hour at 70° C., an elastic, hard coating is obetained, which is not attacked when exposed to a mixture of equal parts of butanol and toluene for 2 hours at room temperature.

Example 13

A solution of 204 parts of DDS in 102 parts of methanol and 102 parts of acetone is allowed to flow at room temperature, in a nitrogen atmosphere and while stirring, into 238 parts of bi-(3-methyl-4-aminocyclohexyl)-methane, the temperature of the reaction mixture rising to about 50° C. during this operation. Then the solvent is distilled off under reduced pressure up to a distillation residue temperature of 90° C. as a maximum, 448 parts of a hard, clear, yellow polysulfonate polyamine resin are obtained, which softens at about 55° C. and dissolves in a mixture of equal parts of methanol and acetone giving a clear solution. An H equivalent of about 147 can be calculated for this polysulfonate polyamine resin. It can be used for hardening epoxy resins.

Example 14

30 parts of a 25% solution of a novolak vinyl sulfonic acid ester in equal parts of methanol and acetone are mixed with 2.5 parts of a 50% solution of bis-(4-aminophenyl)-methane in equal parts of methanol and acetone. A thin layer of the mixture is applied to metal sheets. After storing the coated sheets for three days at room temperature, hard coatings are obtained which are then cured for another hour at 100° C. The coatings are not attacked when exposed to a mixture of equal parts of methanol and acetone for 2 hours at room temperature.

The novolak vinyl sulfonic acid ester used can be prepared as follows from a novolak with a softening point of 93° C. (determined according to Krämer-Sarnow-Nagel) obtained in the usual manner from 94 parts of phenol and 93 parts of a 30% aqueous formaldehyde solution:

250 parts of the said novolak are dissolved in a mixture of 500 parts of acetone and 500 parts of ethylene chloride. 1000 parts of water are added, while stirring. In the course of about 2 hours and at a temperature of between 0° and +14° C., 517 parts of a 25% sodium hydroxide solution, 50 parts of a 10% sodium carbonate solution and 260 parts of β-chloroethane sulfochloride are dripped from separate vessels into this mixture in such a way that the pH value of the reaction mixture is between 9 and 9.5. The mixture is then stirred for an hour at a pH of 6 to 7. Then 500 parts of acetone and 1000 parts of a saturated sodium chloride solution are added, and the organic phase is separated. The residue obtained on vacuum distillation of the organic phase consists of 363 parts of a resin which disolsves in a mixture of equal parts of methanol and acetone giving a clear solution and has an iodine number of 70 (determined according to "Analytical Chemistry," vol. 21, p. 1073, 1949). This novolak vinyl sulfonic acid ester contains, on an average, about 2 vinyl groups in the molecule.

Example 15

227 parts of DDS and 114 parts of 2,2-bis-(4-hydroxyphenyl)-propane are emulsified in 700 parts of water. The resultant emulsion is heated to 70° to 80° C. 60 parts of normal sodium hydroxide solution are allowed to drip into the emulsion in the course of 1½ hours. Stirring is continued for another 2 hours at 70° C. A colorless viscous emulsion is obtained, from which a colorless theromplastic polysulfonate having the $k$-value 20 can be isolated in the usual manner. Instead of 60 parts of sodium hydroxide solution, suspensions of 2 parts of calcium oxide in 50 parts of water or solutions of 8.5 parts of disodium phosphate in 100 parts of water or 10% aqueous solutions of N-benzyl-N,N,N-trimethyl-ammonium hydroxide may be used. Again, colorless thermoplastic polysulfonates having the $k$-value of 20 are obtained.

*Example 16*

114 parts of 2,2-bis-(4-hydroxyphenyl)-propane and 227 parts of DDS are added, while stirring, to a mixture of 700 parts of water and 300 parts of ethylene chloride. The mixture is then heated to 70° C., and 75 parts of normal sodium hydroxide solution are allowed to drip into the mixture in the course of 3 hours. Stirring is continued for another 12 hours at room temperature, the pH value being maintained at 8 to 10 by adding another 25 parts of normal sodium hydroxide solution. Finally the reaction mixture is heated for another hour at 80° C. After separating the solvent, a colorless thermoplastic polysulfonate is obtained which has a $k$-value of 20 and is suitable for the preparation of coatings.

*Example 17*

114 parts of 2,2-bis-(4-hydroxyphenyl)-propane are added, while stirring, to a mixture of 700 parts of water and 227 parts of DDS. The whole is heated to 70° C., and a solution of 15 parts of borax in 50 parts of water is allowed to drip in. A colorless, highly viscous emulsion is obtained, which is maintained at 70° C. for another 6 hours. A high molecular polysulfonate can be separated from the emulsion in the usual manner. It has thermoplastic properties, the $k$-value 20, and can be used to prepare coatings.

*Example 18*

7 parts of bis-(3-methyl-4-aminocyclohexyl)-methane are dissolved in a mixture of 7 parts of methanol and 7 parts of acetone. 19 parts of resorcinol divinyl sulfonic acid ester (hereinafter referred to as "RDS"; iodine number 159) are stirred into the solution. A thin layer of the resultant mixture is immediately applied to a metal sheet. After storing the coated sheet for 1 day at room temperature, it is heated at 100° C. for 1 hour. A hard, glossy, uniform and clear coating is obtained, which is flexible and does not dissolve in a mixture of equal parts of acetone and methanol. Instead of RDS, hydroquinone divinyl sulfonic acid ester may be used.

The fresh coat of the reaction mixture on the metal sheet may also be stored in the air for 22 hours at −8° C. Again, a dry, glossy coating is obtained which, after storing for a few hours at room temperature, does not differ from the coating stored exclusively at room temperature.

The fresh prepared reaction mixture can be used, for example, to prepare exterior coatings on metals. Such coatings may also be applied at temperatures below 0° C.

*Example 19*

4 parts of bis-(3-methyl-4-aminocyclohexyl)-methane are dissolved in a mixture of 4 parts of methanol and 4 parts of acetone. 8 parts of glycol divinyl sulfonic acid ester (iodine number 200) are stirred into the solution. Metal sheets are coated with the reaction mixture. The coated sheets are stored for about 16 hours at room temperature and for another hour at 100° C. Hard, glossy coatings are obtained, which are brittle and insoluble in acetone.

*Example 20*

A thinly liquid melt of 42 parts of RDS and 7 parts of N-methylurea is kept in a mold at 120° C. for 43 hours. A hard, clear mass is obtained, which has elastic properties at temperatures above 60° C. It is insoluble in mixtures of equal parts of ethanol and toluene or methanol and acetone.

If, instead of N-methylurea, 5 parts of urea are used, 68 parts of RDS are employed instead of 42 parts and the reaction is otherwise conducted under the same conditions, a hard, brown, bubbly mass is obtained after 24 hours. It softens at about 80° C. and is also insoluble in the said solvent mixtures.

*Example 21*

20 parts of finely powdered carbamate prepared in the usual manner from bis-(4-aminocyclohexyl)-methane and 48 parts of RDS (iodine number 160) are made into a highly viscous paste by stirring. The paste foams up when heated. After heating for one hour at 130° C., a large-pored, brittle expanded article is obtained which has a density of about 0.2 g./cm.$^3$ and is insoluble in a mixture of equal parts of methanol and acetone.

*Example 22*

49 parts of RDS are mixed with 14 parts of 2,7-diamino-2,7-dimethyloctane in a mold. After storing the mold for 4 days at room temperature, a shaped article is obtained which is resistant to temperatures of up to about 70° C.

20 parts of a 57% solution of a novolak vinyl sulfonic acid ester in a mixture of butanol and toluene are mixed with 10 parts each of methanol and acetone and 6 parts of a 50% solution of bis-(4-aminophenyl)-methane in a mixture of equal parts of methanol and acetone. A thin layer of the mixture is applied to metal sheets. After storing the coated sheets for 3 days at room temperature, hard coatings are obtained, which are then cured for one hour at 100° C. The coatings obtained are not attacked when exposed for 2 hours to a mixture of equal parts of methanol and acetone.

The novolak vinyl sulfonic acid ester used is prepared as follows from a novolak which has been obtained in the usual manner from 94 parts of phenol and 93 parts of a 30% aqueous formaldehyde solution and which has a softening point of 93° C. (determined according to Krämer-Sarnow-Nagel) and an average molecular weight of about 350:

500 parts of the said novolak are dissolved in a mixture of 1000 parts of n-butanol and 1000 parts of toluene. 500 parts of water are added to the solution, while stirring. 1740 parts of a 25% aqueous sodium hydroxide solution and 900 parts of $\beta$-chloroethane sulfochloride are dripped from separate vessels into this mixture, in the course of 2 hours and at a temperature of between 0° and +5° C., in such a way that the pH value of the reaction mixture is between 9 and 9.5. The whole is stirred for half an hour and the pH value adjusted to 6 to 7 by adding concentrated hydrochloric acid. The aqueous layer is separated and the organic layer extracted with 10% aqueous sodium chloride solution. After drying of the organic layer, such an amount of solvent is evaporated therefrom that 1460 parts of a yellow, viscous solution are obtained. This solution contains 57% by weight of a novolak vinyl sulfonic acid ester, has the iodine number 70, and can be diluted with a mixture of equal parts of methanol and acetone. The novolak vinyl sulfonic acid ester contains, on an average, about 3.1 vinyl sulfonic acid ester groups per molecule.

*Example 24*

100 parts of a 30% solution of pyrogallol polyvinyl sulfonic acid ester in a mixture of methanol and acetone are mixed with a solution of 13.5 parts of bis-(3-methyl-4-aminocyclohexyl)-methane in 27 parts of a mixture of equal parts of acetone and methanol. Metal sheets are immediately coated with the mixture. After storing the coated sheets for one day at room temperature, hard coatings are obtained, which are insoluble in a mixture of equal parts of methanol and acetone.

A fabric impregnated with the said solution is dry after the same period and has water-repellent properties.

The pyrogallol polyvinyl sulfonic acid ester used is prepared as follows:

252 parts of pyrogallol are dissolved in a mixture of 500 parts of water and 250 parts of acetone. 500 parts of ethylene chloride are added, while stirring. In the course of 3 hours and at 0° to +5° C., 1075 parts of chloroethane sulfochloride and 2385 parts of a 25% aqueous sodium hydroxide solution are dripped from separate vessels into the emulsion obtained, while stirring and passing nitrogen over the emulsion, in such a way that the pH value is between 8 and 9.5. The whole is then stirred for another half hour, the reaction mixture neutralized with concentrated hydrochloric acid, and the aqueous layer separated. After evaporating the solvent at a pressure of 20 mm. Hg (a temperature of 80° to 90° C. not being exceeded in the distillation vessel), 553 parts of a yellow, highly viscous liquid with the iodine number 170 are obtained from the organic layer.

*Example 25*

50 parts of an 80% solution of a divinyl sulfonic acid ester of a di-(hydroxybenzyl)-xylene in a mixture of butanol and toluene are mixed with a solution of 9.3 parts of bis-(3-methyl-4-aminocyclohexyl)-methane in 20 parts of a mixture of equal parts of methanol and acetone. A metal sheet is coated with the resultant solution. The coated sheet is stored for one day at room temperature and then cured for one hour at 100° C. A glossy, hard coating is obtained, which is insoluble in the above-mentioned solvent mixture.

The divinyl sulfonic acid ester used is prepared as follows from a mixture of di-(hydroxybenzyl)-xylenes which is obtained in the usual manner from 202 parts of a mixture of di-(chloromethyl)-xylenes and 180 parts of phenol and catalytic amounts of zinc chloride:

318 parts of the said di-(hydroxybenzyl)-xylene mixture are dissolved in 1500 parts of a mixture of equal parts of n-butanol and toluene. 300 parts of water are added to the solution. Then 391 parts of β-chloroethane sulfochloride and 800 parts of a 25% sodium hydroxide solution are simultaneously added from separate vessels, in the course of 2 hours, at 0° to +5° C. and while stirring, in such a way that a pH value of between 8 and 9.5 is maintained in the reaction mixture. Stirring is continued for another half hour, the reaction mixture is neutralized by adding concentrated hydrochloric acid, and the aqueous layer separated. The organic layer is extracted with 10% aqueous sodium chloride solution and, after drying, concentrated at a pressure of 30 mm. Hg and a temperature of about 100° C. to such an extent that 624 parts of a solution are obtained as a residue. This solution has the iodine number 78.5 and contains 80% by weight of divinyl sulfonic acid esters of di-(hydroxybenzyl)-xylenes dissolved in a mixture of butanol and toluene.

*Example 26*

25 parts of a polyvinyl sulfonic acid ester of a phenol-acrolein condensation product (iodine number 90) are mixed with a solution of 2.7 parts of bis-(3-methyl-4-aminocyclohexyl)- methane in 10 parts of methanol and 10 parts of acetone. Metal sheets are coated with the resultant mixture. The coated sheets are stored for 3 days at room temperature and then cured for one hour at 100° C. The coatings obtained are hard and highly resistant to the action of chemical reagents.

The vinyl sulfonic acid ester used is prepared as follows from a phenol-acrolein condensation product obtained from 940 parts of phenol and 56 parts of acrolein according to the directions for the production of "polyphenylols A" given in U.S. patent specification No. 2,801,989:

320 parts of the said phenol-acrolein condensation product are dissolved in 520 parts of acetone, and 538 parts of β-chloroethane sulfochloride and 1243 parts of a 25% aqueous sodium hydroxide solution are simultaneously added, at a temperature of 0° to +5° C. and while stirring, in such a way that the pH value of the reaction mixture is about 8 to 9. Stirring is continued for another hour at 0° C. and the reaction mixture is neutralized by adding concentrated hydrochloric acid. Then 200 parts of water are added, and the reaction mixture is extracted, at about 60° C., with 1000 parts of tetrachloroethane. The solvent is evaporated from the resultant extract at a pressure of 20 mm. Hg (a temperature of 130° C. not being exceeded in the distillation vessel), and 486 parts of a brown, sticky mass are obtained, which is soluble in tetrachloroethane, tetrahydrofurane and dimethyl formamide and has the iodine number 90.

*Example 27*

Leather is sprayed with a varnish solution that is prepared as follows:

100 parts of an addition product from 75% by weight of RDS and 25% by weight of sperm oil fatty amine are dissolved in a mixture of 300 parts of acetone and 80 parts of methanol, and 80 parts of methylcyclohexanone and 15 parts of adipic acid diisooctyl ester are added. Then 18 parts of 4,4'-diamino-3,3'-dimethyl-dicyclohexyl-methane, dissolved in 40 parts of isobutanol, are stirred into the mixture. The resultant varnish solution remains fit for spraying for about 4 days.

The varnish coat is dried in the air at room temperature. A high-gloss coating is obtained, which has a supple feel, very good fastness to rubbing, and is not attacked by solvents.

If the varnish solution is applied to chrome-tanned or vegetable-tanned splits which have been bottomed with a casein pigment and polymer binders, dried and pore-grained in the usual manner, varnished leather is obtained which does practically not differ in appearance from the varnished leather described above. Again, the varnish adheres well to the leather.

*Example 28*

Leather is sprayed with a solution of 100 parts of an addition product from 200 parts of DDS and 100 parts of n-butylamine in 150 parts of acetone, 50 parts of ethanol and 80 parts of methylcyclohexanone, which contains 15 parts of dibutyl phthalate. Immediately afterwards, this first coat is sprayed over, while still wet, with a solution of 23 parts of nonadecyl diamine in 50 parts of acetone and 70 parts of ethanol. The varnished leather is dried in the air at room temperature. A high-gloss coating of very good fastness to rubbing and scratching is obtained.

*Example 29*

Leather is sprayed with a mixture that is prepared as follows:

100 parts of a 70% solution of a novolak polyvinyl sulfonic acid ester in equal parts of butanol and toluene are diluted with 400 parts of glycol monoethyl ether, and a solution of 120 parts of a polyamino amide prepared in the usual manner from 2 parts of dehydrated ricinoleic acid and 1 part of propylene diamine in 300 parts of toluene is added.

After storing for 7 days, the solution is still fit for spraying. The varnish coat on the leather is dust-dry after drying in the air for one hour at room temperature, and has cured after another 24 hours. The coating has a very soft, supple feel, fully body and good elasticity.

The novolak vinyl sulfonic acid ester used is prepared as follows from a novolak which has been obtained in the usual manner from 94 parts of phenol and 93 parts of a 30% aqueous formaldehyde solution and which has a softening point of 93° C. (determined according to Krämer-Sarnow-Nagel):

950 parts of the said novolak are dissolved in 4000 parts of a mixture of equal parts of butanol and toluene. 2000 parts of water are added, while stirring. In the course of 2 hours, at —5° C. and while stirring, 1800 parts of β-chloroethane sulfochloride and 3745 parts of a 25% sodium hydroxide solution are dripped from separate vessels into this mixture in such a way that the pH value of the reaction mixture is between 9 and 9.5. Stirring is continued for another half hour, the pH value adjusted to 5.5 to 6.0 by adding concentrated hydrochloric acid, and the aqueous phase of the reaction mixture separated. After washing with concentrated sodium chloride solution and drying at 100° C., the organic phase is concentrated to 2455 parts under reduced pressure. A yellow, clear solution is obtained, which contains 74% by weight of a novolak vinyl sulfonic acid ester and has the iodine number 91.5.

We claim:

1. A process for the production of polysulfonates which comprises reacting at a temperature of between —50° C. and +200° C. (A) a vinyl sulfonic acid ester of an organic polyol selected from the group consisting of alkane diols of from 2 to 18 carbon atoms, polyhydric penols of from 2 to 3 hydroxyl groups, bis-(hydroxyaryl) alkanes with 2 to 6 hydroxyl groups in the aryl radical and with 1 to 18 carbon atoms in the alkylene radical, bis-(hydroxyaryl) sulfones with 2 to 6 hydroxyl groups in the aryl radicals, and novolaks, said vinyl sulfonic acid esters containing 2 to 6 vinyl sulfonic acid ester groups in the molecule with (B) an organic compound containing at least 2 active hydrogen atoms, being determinable according to the method of Zerewitinoff and said organic compound being selected from the group consisting of polyhydric phenols of from 2 to 3 hydroxyl groups, novolaks, bis-(hydroxyaryl)-alkanes with 2 to 6 hydroxyl groups in the aryl radicals and 1 to 18 carbon atoms in the alkylene radical, nitrogen containing organic compounds having a molecular weight of 31 to 5000 in which the active hydrogen atoms are attached to the nitrogen atoms of radicals selected from the group consisting of amino, amido and imino groups, polythioether, polymercaptams and thioglycolic acid esters of polyhydric alcohols.

2. A process for the production of polysulfonates which comprises reacting at a temperature of between —50° C. and +150° C. (A) a vinyl sulfonic acid ester of an organic polyol selected from the group consisting of alkane diols of from 2 to 18 carbon atoms, polyhydric phenols of from 2 to 3 hydroxyl groups, bis-(hydroxyaryl)-alkanes with 2 to 6 hydroxyl groups in the aryl radical and with 1 to 18 carbon atoms in the alkylene radical, bis-(hydroxyaryl) sulfones with 2 to 6 hydroxyl groups in the aryl radicals, and novolaks, said vinyl sulfonic acid esters containing 2 to 6 vinyl sulfonic acid ester groups in the molecule, with (B) an organic nitrogen containing compound containing 2 active hydrogen atoms attached to the nitrogen atoms of radicals selected from the group consisting of amino, amido and imino groups and having a molecular weight of between 31 and 5000.

3. Polysulfonates obtained by reacting at a temperature of between —50° C. and +200° C. (A) a vinyl sulfonic acid ester of an organic polyol selected from the group consisting of alkane diols of from 2 to 18 carbon atoms, polyhydric phenols of from 2 to 3 hydroxyl groups, bis-(hydroxyaryl)-alkanes with 2 to 6 hydroxyl groups in the aryl radical and with 1 to 18 carbon atoms in the alkylene radical, bis-(hydroxyaryl) sulfones with 2 to 6 hydroxyl groups in the aryl radicals, and novolaks, said vinyl sulfonic acid esters containing 2 to 6 vinyl sulfonic acid ester groups in the molecule, with (B) an organic compound containing at least 2 active hydrogen atoms being determinable according to the method of Zerewitinoff and said organic compound being selected from the group consisting of polhydric phenols of from 2 to 3 hydroxyl groups, novolaks, bis-(hydroxyaryl)-alkanes with 2 to 6 hydroxyl groups in the aryl radicals and 1 to 18 carbon atoms in the alkylene radical, nitrogen containing organic compounds having a molecular weight of 31 to 5000 in which the active hydrogen atoms are attached to the nitrogen atoms of radicals selected from the group consisting of amino, amido and imino groups, polythioether, polymercaptams and thioglycolic acid esters of polyhydric alcohols.

4. Polysulfonates obtained by reacting at a temperature of between —50° C. and +150° C. (A) a vinyl sulfonic acid ester of an organic polyol selected from the group consisting of alkane diols of from 2 to 18 carbon atoms, polyhydric phenols of from 2 to 3 hydroxyl groups, bis-(hydroxyaryl)-alkanes with 2 to 6 hydroxyl groups in the aryl radical and with 1 to 18 carbon atoms in the alkylene radical, bis-(hydroxyaryl) sulfones with 2 to 6 hydroxyl groups in the aryl radicals, and novolaks, said vinyl sulfonic acid esters containing 2 to 6 vinyl sulfonic acid ester groups in the molecule, with (B) an organic nitrogen containing compound containing 2 active hydrogen atoms attached to the nitrogen atoms of radicals selected from the group consisting of amino, amido and imino groups and having a molecular weight of between 31 and 5000.

5. A process for the production of polysulfonates which comprises reacting at a temperature of between —50° C. and +200° C., a vinyl sulfonic acid ester of a bis-(hydroxyaryl)-alkane with 2 to 6 hydroxyl groups in the aryl radical and with 1 to 18 carbon atoms in the alkylene radical with an amine having at least 2 hydrocarbon atoms attached to the nitrogen and having a molecular weight of between 31 and 5000.

6. A process as claimed in claim 5 wherein the used amine is a cycloalkyl amine.

7. A process for the production of polysulfonates which comprises reacting at a temperature of between —50° C. and +200° C. a vinyl sulfonic acid ester of a bis-(hydroxyaryl)-alkane with 2 to 6 hydroxyl groups in the aryl radical and with 1 to 18 carbon atoms in the alkylene radical with a polymercaptam.

8. A process for the production of polysulfonates which comprises reacting at a temperature of between about —50° and +150° C. divinyl sulfonic acid esters of aromatic diols with an organic nitrogen-containing compound containing at least 2 active hydrogen atoms attached to the nitrogen atoms of radicals selected from the group consisting of amino, amido and imino groups and having a molecular weight of between 31 and about 5000.

9. A process for the production of polysulfonates as claimed in claim 1, wherein 1 to $m$ times the equivalent amount of vinyl sulfonic acid esters of organic polyols containing at least 2 vinyl sulfonic acid ester groups in the molecule is used per mol of organic compounds containing at least 2 active hydrogen atoms in the molecule, $m$ being the average number of vinyl sulfonic acid ester groups per molecule of said vinyl sulfonic acid esters.

10. A process for the production of polysulfonates as claimed in claim 1, wherein 1 to $n$ times the equivalent amount of organic compounds containing at least 2 active hydrogen atoms in the molecule is used per mol of vinyl sulfonic acid esters of organic polyols containing at least 2 vinyl sulfonic acid ester groups in the molecule, $n$ being the average number of active hydrogen atoms per molecule of said organic compounds.

References Cited by the Examiner

UNITED STATES PATENTS

| | | | |
|---|---|---|---|
| 2,321,890 | 6/1943 | Berchet | 260—79.3 |
| 2,632,757 | 3/1953 | Reynolds et al. | 260—79.3 |
| 2,667,468 | 1/1954 | Jones et al. | 260—79.3 |
| 2,680,728 | 6/1954 | Reeder et al. | 260—49 |

JOSEPH L. SCHOFER, *Primary Examiner.*

H. N. BURSTEIN, WILLIAM H. SHORT, *Examiners.*